Oct. 19, 1954
E. F. WILSON ET AL
2,691,952
FUSION WELDING BACKING MEANS
Original Filed Sept. 1, 1942
2 Sheets-Sheet 1
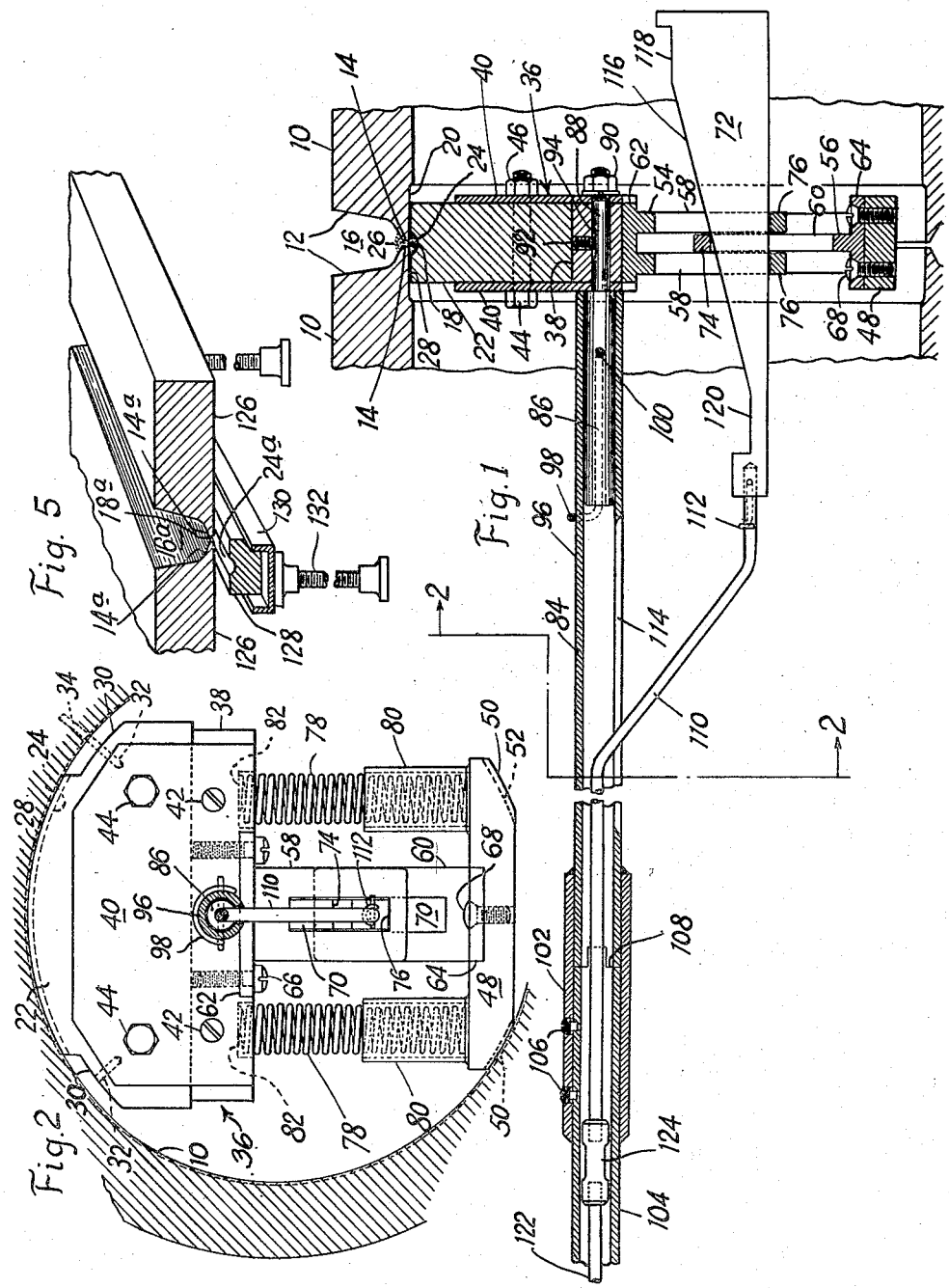
INVENTORS
Evan F. Wilson, John C. Grubb
BY  and Floyd A. Fowler.
ATTORNEY Oct. 19, 1954 E. F. WILSON ET AL 2,691,952
FUSION WELDING BACKING MEANS
Original Filed Sept. 1, 1942 2 Sheets-Sheet 2
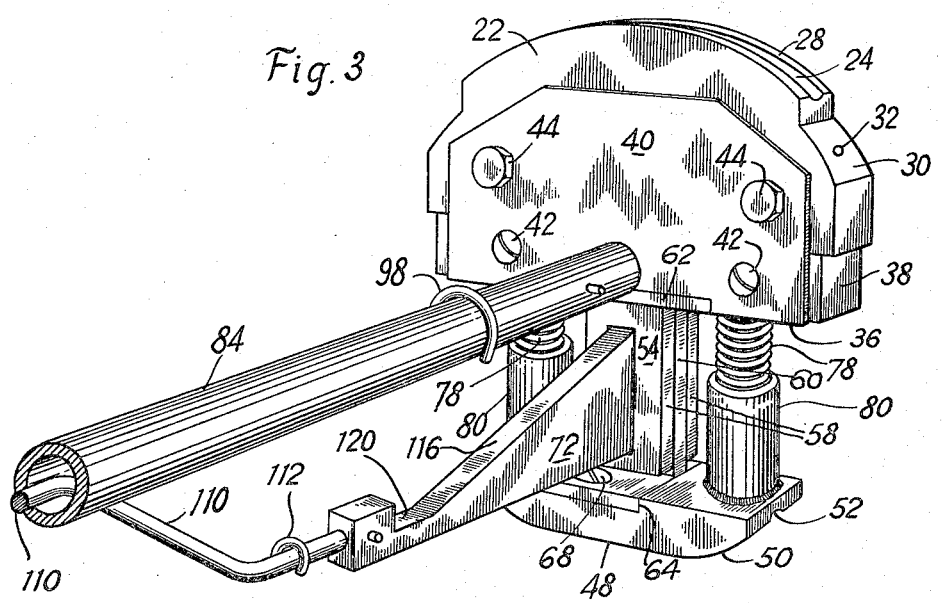
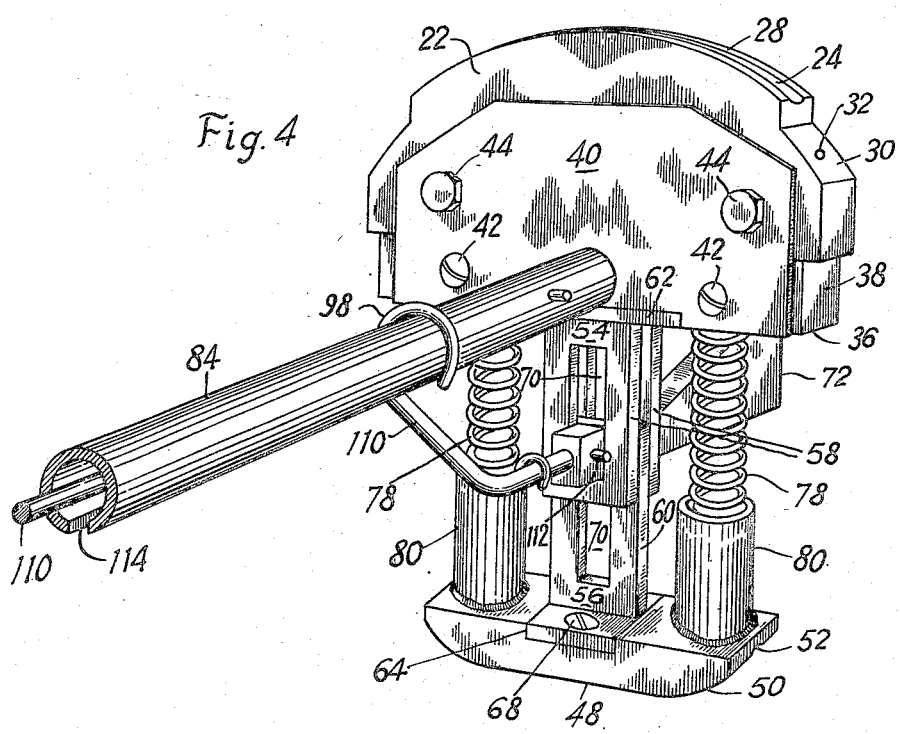
INVENTORS
Evan F. Wilson, John C. Grubb
BY and Floyd A. Fowler
ATTORNEY Patented Oct. 19, 1954

2,691,952

UNITED STATES PATENT OFFICE 2,691,952

FUSION WELDING BACKING MEANS

Evan F. Wilson, Akron, John C. Grubb, Barberton, and Floyd A. Fowler, Toledo, Ohio, assignors to The Babcock & Wilcox Company, Jersey City, N. J., a corporation of New Jersey Original application September 1, 1942, Serial No. 456,856. Divided and this application May 8, 1948, Serial No. 25,864

4 Claims. (Cl. 113—111)

This invention relates in general to the fusion welding of metal plates and sections wherein the welding surfaces of the parts being welded are arranged in abutting relation to provide a groove for the reception of welding metal. More specifically, the invention relates to improved means for backing the groove during weld metal deposition, and especially, to apparatus of the character disclosed in our copending original application Serial No. 456,856, filed September 1, 1942, now Patent No. 2,441,176, issued May 11, 1948, of which the present application is a division.

In conjunction with such welding, commonly referred to as butt-welding, it has been customary to back-up the welding groove with a member which will inhibit the flow of weld metal therefrom while in a molten state, and for this purpose, metal strips or rings have been used which become welded in place. This is ordinarily objectionable and their removal often requires considerable effort and expense by chipping or machining. If left in place, particularly in the case of tubular bodies, such strips or rings obstruct the flow of the medium conveyed and interfere with either visual or radiographic inspection.

Certain varieties of more readily destructible backing members have been developed but these have in general been unsatisfactory due to the materials used and other factors which have resulted in contamination of the weld metal of the joint.

As disclosed in said original application, an object of the invention is to provide a backing member of such characteristics that it may readily be removed from the welding zone when desired, and one that by suitable selection of its material and formation may be utilized repeatedly for successive welding operations either in conjunction with a single seam, or with a plurality of seams.

Another object is the utilization of a backing material or materials which will have no deleterious effect on the weld metal within the groove, but rather will contribute to the production of a sound weld through the prevention of slag entrapment.

A further object is to enable inspection to be made of the joint at any stage of the operations whereby repairs can be made if necessary, before a large amount of metal has been deposited which needs to be chipped out to reach the defect.

Other objects are concerned with the support and ready manipulation of the backing member before, during and after the welding operations, involving apparatus applicable to work pieces of various forms and dimensions, such apparatus being desirably arranged to maintain the member in resilient engagement with the work, when operatively positioned with respect to a seam to be welded. These objects also contemplate support of the backing mass by adjustable means adapted to move the mass to and from operative position and to maintain the mass in a predetermined position of adjustment.

With the foregoing objects in view, we have chosen to use a non-metallic, refractory material as a backing for the welding groove, of such character as to withstand the direct heat of the electric arc, or other source of welding heat, and thus eliminate any tendency for the material to become permanently attached to the work or to have any detrimental effect on the quality of the weld metal.

The surface in contact with the work is preferably of carbon, and in one form may be provided as a coating or layer of graphite on the outer surface of a ceramic body portion or core, formed for example of silica sand suitably bonded and baked, the graphite being applied either as a dry powder, or as a wash consisting of a graphite-water mixture. A backing member constructed in this manner may be conveniently formed to any desired shape and may be readily destroyed, if desired, to facilitate its removal from the working zone after welding. Furthermore, the refractory core is sufficiently permeable to carry away gases which might otherwise be introduced into the metal. One effect of the carbon layer is to provide an exposed portion more refractory to the heat of welding than the inner body portion, the melting point of carbon being above 6300° F., practically twice that of the body portion which, although composed of high melting point oxides, would ordinarily become fused if directly exposed to the temperatures encountered in welding. A second and more important effect of the carbon surface is to prevent entrapment of slag within the body of weld metal, the slag otherwise reacting with the minerals of the backing member, if left uncoated, and thus adhering to the member to prevent its flotation to the surface.

In another form, the backing member may be of solid graphite or carbon which has certain advantages in that it may be machined or filed to the desired fit, and furthermore, if destroyed for purposes of removal, the residual carbon fragments which are relatively soft will not seriously affect the operation of valves or other parts susceptible to wear.

With a refractory backing member of carbon or the like placed against the back of the seam, a metal powder, preferably iron, is sprinkled along the groove in a continuous layer against the backing member where the powder is melted upon the application of welding heat to provide a pool which serves as an effective barrier to slag entrapment, any non-metallic bodies such as slag being floated to the surface of the molten iron to assure clean metal throughout the root of the weld.

Weld metal is fused into the groove progressively along its length simultaneously with the melting of the iron powder, the molten powder and deposited weld metal combining to form the initial layer at the base, and subsequent layers being laid down and the welding of the seam completed as described hereinafter.

The powder may be tamped lightly before welding to prevent excessive voids or looseness, but without appreciable pressure, otherwise the desired porosity of the mass would be reduced. The powder is melted rapidly at the exposed surface of the mass, due to the fineness of its particles, thus forming a molten surface from wall to wall of the groove, and since the mass is relatively porous and provides poor thermal contact, the penetration of heat through the powder is retarded despite its rapid surface fusion, and in consequence the fusion is superficial and only a small quantity of powder is required. Moreover the bead protruding from the underside of the finished weld is small which for tubular structures provides a minimum amount of internal obstruction. If there should be any indication of carburization of the metal due to the use of a carbon retainer or backing, this may be avoided by increasing the amount of powder so that only a portion is fused. It is contemplated that for position welding, that is, other than horizontal, it might be desirable to employ a bonded powder in order to hold the powder in place, provided the bonding material is of a non-slag-forming character.

Pure or relatively pure iron powder of a fineness of approximately 100 mesh has been found especially effective for our purpose in the welding of ferrous metals. Steel powder can also be used, but the iron has proved more effective, probably because of its higher melting point. An advantage in using powder is that it is adaptable to various shapes and sizes of grooves, but it is to be noted that in certain instances an iron foil or a mild steel foil may be substituted, or a strip or other shape of such metals, or a combination of one or more of such forms with powder in suitable proportions. It will be understood that alloys of suitable properties may also be used to provide the initial metallic pool.

Experiments have indicated that certain other materials such as plastics might be used to replace carbon as the backing material, and such substitutions are contemplated as being within the scope of the invention provided there is substantial equivalency in their properties relative to carbon for which the substitution is made.

The various features of novelty which characterize our invention are pointed out with particularity in the claims annexed to and forming a part of this specification. For a better understanding of the invention, its operating advantages and specific objects attained by its use, reference should be had to the accompanying drawings and descriptive matter in which we have illustrated and described preferred embodiments of our invention.

Of the drawings:

Fig. 1 is a sectional elevation of apparatus useful in the practice of our invention;

Fig. 2 is an end view of parts shown in Fig. 1, in section along line 2—2;

Figs. 3 and 4 are perspective views of apparatus shown in Figs. 1 and 2, in different positions of adjustment; and, Fig. 5 is a fragmentary view showing a modified application of the invention.

According to Fig. 1, the parts 10 to be welded together are in the form of tubular sections, for example, shaped at their end edges 12 to provide lip portions 14 at the bottom of a welding groove 16 adapted to receive and retain molten welding metal for uniting the parts by fusion. The parts 10 may be suitably supported to maintain their relative positions as shown, in axial alignment and with the lips 14 spaced apart to provide a narrow gap 18 of approximately one-eighth inch, for example, for plates measuring about two inches in thickness. The parts 10 may be further shaped at their ends to provide a shallow circumferential recess 20 formed inwardly of the lips 14 and spanning the gap 18 to provide a bearing surface for the arcuately surfaced backing member 22. The recess is preferably formed by counterboring each section 10 to a true cylindrical surface of predetermined diameter, thus correcting for possible variations in inside diameters and eccentricities of the sections, in accordance with the known variations permissible in the commercial manufacture of tubular products. Such counterboring assures a close fit between the backing member 22 and the work at any circumferential location to which the member may be applied, and enables the same member, or members, of a corresponding predetermined curvature, to be used interchangeably with any two correspondingly counterbored sections of the same nominal diameter and thickness, as is desirable in quantity production.

For the purposes of this invention, the backing member 22 of a non-metallic, refractory material, such as carbon, for example, in block form and shaped to engage an arc of the cylindrical surface 20, is formed with a groove 24 in its outer surface to provide a space suitable for the size of inside bead desired, a depth approximately equal to the width of the gap 18 having been found convenient, and a radius somewhat greater than the gap dimension.

With the parts 10 in position for welding as shown in Fig. 1, the grooved block 22 is held in close engagement with the under surface of the lips 14, preferably by means of a tool or machine, of a type to be described in detail hereinafter, whereby the block may be moved conveniently into and out of the welding position, and from one welding zone to another, if necessary, as the welding proceeds. Iron powder, for example, of relatively pure chemical composition is placed in the welding groove 16 to a depth at least level with the top edges of the lips 14, and preferably to a somewhat greater depth to cover the lips, approximately as shown at 26 in Fig. 1, prior to introduction of the welding metal, the powder substantially filling the cavity formed by the block groove 24 below the lips 14, the gap 18 between the lips, and the bottom portion of the welding groove 16 above the lips. Welding metal is then deposited within the groove 16, by the electric arc welding process, for example, utilizing electrodes in the top or down-hand position for laying down at least the first two beads or layers at the base of the groove, in successive lengths or sections throughout the total length of the seam. The length of each section is preferably somewhat less than the length of contact surface between the carbon backing-up member and the work, and since the contacting length is made relatively small to insure a close fit, it is generally necessary to shift the carbon member and work relatively for each additional section to be welded. When welding circumferential seams, the length of a section is made small enough to permit welding at all times from the top of the groove. Each section is preferably completed by the deposition of at least two layers while the backing-up block is in place for that particular section, for the purpose of alleviating the danger of the weld metal burning through, the second layer of a section being deposited immediately upon the first layer of the section, and the multiple-layer deposit being allowed to cool to about 800° F. before shifting the block to a new position and proceeding to lay down the first layer of the succeeding section. When it is necessary to renew electrodes, thus requiring interruption of the arc, the end of the bead length already deposited is preferably tapered by chipping for a distance of about one-half inch before the succeeding electrode is started to insure complete fusion and the elimination of holes or defects caused by restriking the arc. It is desirable to add a small quantity of iron powder to the chipped area to replace the amount displaced as a result of the chipping operation.

After the sections have been completed in the manner just described, to the extent of providing a continuous weld throughout the length of the seam at the base of the groove 16, the remainder of the groove may be filled with welding metal according to established practices to complete the union of the two parts 10 of the work.

A desirable feature of this method of welding is that by applying a metal powder within the gap 18 between the lips 14 and above the lips, a protective pool of relatively pure metal is provided at the lowermost point of the seam and prevents slag from the electrode covering, or resulting from oxidation of the work metal, from being entrapped in the gap where the parts to be welded adjoin, the carbon surface of the retainer 22 effectively preventing the formation of slag from beneath the gap. With this method also, it is possible to examine the weld from the underside at intermediate stages for any defects which may have inadvertently occurred during the process, and to make repairs before depositing additional metal, since the backing member may be readily shifted or removed to entirely expose a portion already welded.

After welding, the iron originally in powder form is evident as a small, fairly uniform ridge standing out from the underside of the work, the use of the highly refractory backing member permitting complete fusion without burning through as might be possible with a steel backing element or metallic backing-up parts, and because of good fusion the ridge and its junction with the work being rounded so that there are no notching or crack-like effects.

A form of backing apparatus is shown in Figs. 1 to 4 inclusive for adjustably supporting the refractory backing-up member 22, for example, in relation to a circumferential seam between tubular work pieces 10. In such an arrangement the outer surface 28 of the member 22 is made arcuate, preferably to a predetermined radius as has already been indicated, for engagement with the counterbored work surface 20 at the underside of the lips 14. The groove 24 preferably extends throughout the entire length of the arcuate surface 28, and beyond the ends of the surface 28 the block is recessed as at 30 where holes 32 are provided to receive pins 34 long enough to extend through the gap 18 between the work parts 10 to facilitate alignment of the groove 24 with the gap, while the block 22 is in contact with the work for welding, as shown, and also while the work is being rotated to an adjacent welding position. The pins are removable and both may be used when making the initial adjustment, whereas for subsequent adjustments, after a section of the weld has been completed and groove 24 is to be aligned with the gap at an adjacent circumferential location, one pin is removed due to interference with the welded section while the bead formed by fusion of the iron powder in that section and extending into the groove 24 serves as a guide in place of the pin. The apparatus for supporting the tubular parts 10 may be of a known type, with rollers, for example, providing for rotation of the parts for the purpose described.

The backing apparatus includes an extensible support adapted to be positioned inwardly of the parts 10 for holding the block 22 in firm engagement with one wall of the work while transmitting the resulting thrust to the opposite wall. The support is shown in a partially extended working position in Figs. 1 and 2; in the fully retracted position in Fig. 3, in which position it is set for insertion or withdrawal, and in the fully extended position in Fig. 4.

The upper portion 36 carrying the block 22 is in the form of a channel and comprises a rectangular bar 38 to which side plates 40 are secured, as by screws 42, the block 22 resting on the bar 38 and being held in place by bolts 44 extending through the block and side plates, with nuts 46 at their ends. The lower portion comprises a base plate 48 having its outer edges rounded as at 50 to a radius suitable for the size or sizes of tubular parts with which the support is to be used, the resulting curved surfaces 50 being grooved as at 52 to provide a clearance for the inwardly protruding bead of weld metal which is formed as the welding progresses. The recess 20 is preferably made of suitable width to provide a bearing surface for base plate 48 at one end of the support, in addition to a bearing surface for the backing member 22 at the opposite end, as heretofore described.

Upper and lower slotted guides 54 and 56 provide an adjustable connecting strut between the block carrier 36 and base plate 48, the upper guide having outer slotted blades 58 slidably engaging the single intermediately positioned slotted blade 60 of the lower guide to enable the support to be extended and retracted to the extent required for moving the backing-up member 22 into and out of engagement with the work surface. Each guide is flanged at one end, and the flanges 62 and 64 respectively secured to the block carrier 36 and the base plate 48 by screws 66 and 68. The guides are slotted longitudinally as at 70 to provide accommodation for an adjusting wedge member 72 which cooperates with the cross bars 74 and 76 at the ends of the slots for causing the guides to move relatively and thereby adjusting the amount to which the support is extended or retracted. The support is continuously biased toward the fully extended position through the action of springs 78 which are received at their lower ends in cylindrical guides 80 fixed to the base plate 48, and which at their upper ends bear against the carrier bar 38 within the cylindrical guides or recesses 82.

A positioner element, denoted generally by the character 84, is provided for convenience in moving the block-support longitudinally of the work, as is necessary for example when bringing the block 22 into register with the seam interiorly of a tubular body 10. The positioner 84, includes a pin 86 having a portion 88 of reduced diameter extending through the carrier bar 36 and side plates 40 and held in place by nut 90 at its outer end and by the set screw 92 which engages the flat 94 to prevent rotational displacement. A tubular section 96 of the positioner element is detachably connected to the pin 86 by means of a removable locking pin 98 having its ends inserted through registering holes 100 in the positioner tube 96 and pin 86. A coupling tube 102 secured adjacent the outer end of the tube 96 provides a socket for a tubular extension section 104 secured therein by set screws 106 and having a notched end 108 interfitting with the end of section 96.

The adjusting wedge 72 by which the elevation of the block 22 is regulated extends through the slots 70 in guides 54 and 56 and is detachably coupled to an adjusting rod 110 by means of a removable locking pin 112, similar to pin 98 for the positioner. The rod 110 is reversely bent as shown to provide a major straight length portion movable longitudinally within the tubular positioner sections 96 and 104 for convenience of manipulation and compactness of assembly, the section 96 being slotted as at 114 a sufficient distance to make available the full range of adjustment as determined by the rise of the inclined surface 116, from the fully retracted position of Fig. 3 when the cross bar 74 engages the flat surface 118 at the high end of the incline to the fully extended position of Fig. 4 when the cross bar 74 engages the flat surface 120 at the low end. The adjusting rod 110 may include an extension piece 122 joined to its original length by a coupling 124 and fitted with a handle at its outer end, if desired. The length of extension required will be generally determined by the dimensions of the work, and various lengths may be used to suit various work piece dimensions, the same applying to the length of extension provided for the positioner element 84.

Fig. 5 shows a modified application of the invention wherein the work pieces 126 are represented as flat plates having ends shaped and arranged to provide a longitudinal groove 16a similar in cross-section to the circumferential groove 16 in Fig. 1, with lips 14a separated by a gap 18a as in the previous embodiment. The refractory backing-up block or bar 128 of carbon, for example, having a groove 24a in its upper surface, is supported in a metal trough or channel 130 against the underside of the lips 14a, with the groove 24a in alignment with the gap 18a. It will be understood that the plates 126 may themselves be independently supported by suitable known devices, while providing a separate adjustable support for the block carrier 130 diagrammatically indicated at 132, for advancing and retracting the block 128 relative to the work 126, the number of supporting elements 132 and their positions being varied as required. The welding procedure is as previously detailed, the iron powder being placed in the welding groove 16a to a level sufficient to at least fill the gap 18a and preferably somewhat higher to cover adjacent portions of the lips 14a, and the weld metal deposited throughout the length of the groove at its base, with the backing-up member in position, before adding other weld metal to fill the groove.

The arrangement indicated in Fig. 5 may be applied to the welding of curved plates, as in the welding of longitudinal and circumferential seams in tubular bodies, particularly when the diameters are large enough to permit access to the interior for positioning and adjusting the block carrier 130 and its supports 132, since without change in the form of the welding groove, the variation entails merely minor changes in the shape or contour of the block 128 and carrier 130 appropriate to the curvature of the plates as will be readily understood by those skilled in the art without detailed description and illustration. For the longitudinal seams in smaller sized tubular bodies it may be found desirable to utilize the apparatus of Fig. 1, with minor adaptations to suit the longitudinal direction of welding, the positioning and adjusting mechanisms remaining substantially the same.

The invention as herein disclosed in accordance with the provisions of the statutes will be understood by persons skilled in the art to be applicable in arrangements other than those specifically described, and to include features which may be used to advantage without a corresponding use of other features, within the scope of the appended claims.

We claim:

1. Apparatus for backing a circumferential seam to be welded in the wall of a tubular body, comprising, a back-up block for engagement with the inner surface of said wall at one peripheral location, a carrier on which said block is mounted, a support for engagement with said inner wall surface at a peripherally opposite location, said block and said support respectively having outer end surfaces of generally convex curvatures, plate-like guides connected respectively to said carrier and to said support and arranged parallel to one another in relative slidable relationship longitudinally of their lengths, and at substantially right angles to said curved outer end surfaces of said block and said support, means for maintaining said guides in said relative slidable relationship, a pair of compression springs interposed between and engaging said carrier and said support, said guides having registering slots elongated in the direction of said slidable relationship, said slots terminating in closed inner ends within the bodies of said guides, an elongated wedge member extending through said registering slots for slidable movement therein between and against said closed inner ends, an elongated rod-like positioning member secured to said carrier, and an elongated rod-like positioning member secured to said wedge member and extending in the same direction as said first named positioning member.

2. Apparatus as defined in claim 1 wherein an odd number of said guides are provided and arranged in interleaved relationship, said wedge member having one wedging edge facing said support and arranged at right angles to said guides, and a second wedging edge facing said carrier and arranged at an inclination to said guides.

3. Apparatus for backing a circumferential seam to be welded in the wall of a tubular body of generally circular cross section, comprising, a back-up block for engagement with the inner surface of said wall at one location, a carrier on which said block is mounted, a support for engagement with said inner wall surface at a diametrically opposite location, said block and said support respectively having outer end surfaces of generally convex curvature, plate-like guides connected respectively to said carrier and to said support and arranged in transverse planes normal to said convex outer end surfaces, in interleaved slidable relationship longitudinally of their lengths, with alternate guides constituting a majority of said guides and being connected to said carrier, said guides having registering slots elongated in the direction of said slidable relationship and closed at their inner ends, an elongated wedge member extending through said registering slots for slidable movement therein between and against said closed inner ends, an elongated rod-like positioning member secured to said carrier, and an elongated rod-like positioning member secured to said wedge member and extending in the same direction as said first named positioning member.

4. Apparatus as defined in claim 3 wherein said wedge member is formed with one wedging edge facing said support, and a second wedging edge facing said carrier, said second wedging edge being arranged at an inclination to said guides and extended at its opposite ends in surface portions arranged parallel to said one wedging edge.

References Cited in the file of this patent

UNITED STATES PATENTS

| Number | Name | Date |
|---|---|---|
| 388,246 | Benardos | Aug. 21, 1888 |
| 963,603 | Lunceford | July 5, 1910 |
| 1,642,825 | Pearce | Sept. 20, 1927 |
| 1,665,815 | Mauser | Apr. 10, 1928 |
| 1,719,720 | Olsen | July 2, 1929 |
| 1,770,649 | Kirkman | July 15, 1930 |
| 1,844,263 | Priebe | Feb. 9, 1932 |
| 1,906,987 | McDougall | May 2, 1933 |
| 1,948,764 | Koch | Feb. 27, 1934 |
| 1,962,297 | Candy et al. | June 12, 1934 |
| 1,962,350 | Kane | June 12, 1934 |
| 1,962,351 | Kane | June 12, 1934 |
| 1,964,926 | Moss | July 3, 1934 |
| 2,010,155 | Hull | Aug. 6, 1935 |
| 2,043,020 | Thiemer | June 2, 1936 |
| 2,089,840 | Rockefeller | Aug. 10, 1937 |
| 2,167,338 | Murcell | July 25, 1939 |
| 2,205,002 | Tripp | June 18, 1940 |
| 2,256,879 | Cornell | Sept. 23, 1941 |
| 2,272,698 | Garrett et al. | Feb. 10, 1942 |
| 2,362,505 | Smith | Nov. 14, 1944 |
| 2,365,226 | Stout | Dec. 19, 1944 |
| 2,408,255 | Elliott | Sept. 24, 1946 |
| 2,413,103 | Forbes | Dec. 24, 1946 |
| 2,452,867 | Price | Nov. 2, 1948 |
| 2,469,965 | Holt | May 10, 1949 |
| 2,522,459 | Mitchell | Sept. 12, 1950 |